(12) United States Patent
Thomas et al.

(10) Patent No.: US 9,317,717 B2
(45) Date of Patent: Apr. 19, 2016

(54) SEPARATE CRYPTOGRAPHIC KEYS FOR PROTECTING DIFFERENT OPERATIONS ON DATA

(71) Applicant: Open Invention Network, LLC, Durham, NC (US)

(72) Inventors: Geoffrey G. Thomas, San Francisco, CA (US); John Whaley, Fremont, CA (US); Thomas Joseph Purtell, II, Menlo Park, CA (US)

(73) Assignee: Open Invention Network, LLC, Durham, NC (US)

( * ) Notice: Subject to any disclaimer, the term of this patent is extended or adjusted under 35 U.S.C. 154(b) by 0 days.

(21) Appl. No.: 13/729,370

(22) Filed: Dec. 28, 2012

(65) Prior Publication Data

US 2014/0189363 A1    Jul. 3, 2014

(51) Int. Cl.
    *G06F 21/62*      (2013.01)

(52) U.S. Cl.
    CPC ......... *G06F 21/6272* (2013.01); *G06F 21/6218* (2013.01); *G06F 2221/2107* (2013.01)

(58) Field of Classification Search
    CPC ....... G06F 21/00; G06F 21/602; G06F 21/60; G06F 21/6272; G06F 21/6218; G06F 2221/2107; G06Q 20/00; G06Q 20/02

USPC .............. 713/171, 190, 191, 189; 726/20, 26; 380/223, 226, 228, 259, 260, 264, 43, 380/277–286

See application file for complete search history.

(56) References Cited

U.S. PATENT DOCUMENTS

| | | | |
|---|---|---|---|
| 6,278,913 B1 * | 8/2001 | Jiang ................................ 701/3 |
| 6,446,209 B2 * | 9/2002 | Kern et al. ..................... 713/193 |
| 7,904,732 B2 * | 3/2011 | Cui et al. ....................... 713/193 |
| 7,991,155 B2 * | 8/2011 | Fujioka et al. ................ 380/201 |
| 8,028,166 B2 * | 9/2011 | Thibadeau .................... 713/168 |
| 8,077,871 B2 * | 12/2011 | Kato ............................. 380/277 |
| 8,166,565 B1 * | 4/2012 | Tormasov et al. .............. 726/27 |
| 2007/0014403 A1 * | 1/2007 | Loo et al. ...................... 380/201 |
| 2008/0089517 A1 * | 4/2008 | Bianco et al. ................. 380/259 |
| 2008/0235522 A1 * | 9/2008 | Suzuki et al. ................. 713/193 |
| 2011/0314304 A1 * | 12/2011 | Braams ......................... 713/193 |
| 2014/0025944 A1 * | 1/2014 | Maletsky et al. ............. 713/150 |

\* cited by examiner

*Primary Examiner* — Chau Le
*Assistant Examiner* — Muhammad Chaudhry
(74) *Attorney, Agent, or Firm* — Haynes and Boone, LLP (57) ABSTRACT

The disclosed embodiments provide a system that processes data. During operation, the system uses a first key to protect a write operation on the data. Next, the system uses a second key to protect a read operation on the data.

8 Claims, 4 Drawing Sheets

SEPARATE CRYPTOGRAPHIC KEYS FOR PROTECTING DIFFERENT OPERATIONS ON DATA

RELATED APPLICATION

The subject matter of this application is also related to the subject matter in a co-pending non-provisional application by inventors Thomas Joseph Purtell II and John Whaley, entitled "Policy-Based Layered Filesystem Management," having Ser. No. 12/435,279 and filing date 4 May 2009.

BACKGROUND

1. Field

The disclosed embodiments relate to techniques for protecting data. More specifically, the disclosed embodiments relate to techniques for using separate cryptographic keys for protecting different operations on the data, such as read operations and write operations.

2. Related Art

Data on network-enabled electronic devices is frequently stored, shared, and/or backed up using remote storage mechanism such as file hosting services, cloud storage services, and/or remote backup services. For example, a user may use a cloud storage service to store and/or back up a file on a personal computer, laptop computer, portable media player, personal digital assistant, tablet computer, and/or smart phone. After the file is uploaded to the cloud storage service, the user may retrieve the file and/or share the file with other users from the cloud storage service.

However, storage of data on untrusted remote storage mechanisms may be associated with a number of security issues. First, the data may be accessed by an unauthorized third party, thus compromising the confidentiality of the data. For example, the data may be obtained by an attacker if the attacker steals authentication credentials for accessing the data on cloud storage and/or reads packets containing the data during writing of the data to cloud storage and/or reading of the data from cloud storage. Second, the unauthorized third party may compromise the integrity of the data by modifying and/or tampering with the data. For example, an attacker may inject packets into a network connection between a user writing the data and cloud storage, resulting in storing of the packets' payloads with the data on the cloud storage and/or subsequent reading of the stored payloads from the cloud storage by the user and/or other users.

Hence, use of untrusted remote storage mechanisms may be facilitated by securing both the storage of data on the remote storage mechanisms and the transmission of the data between the remote storage mechanisms and network-enabled electronic devices.

SUMMARY

The disclosed embodiments provide a system that processes data. During operation, the system uses a first key to protect a write operation on the data. Next, the system uses a second key to protect a read operation on the data.

In some embodiments, the system also uses a third key to protect the write operation on metadata for the data and uses a fourth key to protect the read operation on the metadata.

In some embodiments, using the first key to protect the write operation involves using a data key to encrypt the data, and using the first key to generate a signature associated with the data. For example, the data key may be a symmetric key, and the first key may be a private key that is part of a asymmetric private/public key pair. The first key may also be used to encrypt the symmetric key.

In some embodiments, using the second key to protect the read operation involves using the data key to decrypt the data, and using the second key to verify the signature. For example, the second key may be a public key that is part of the same asymmetric private/public key pair as the first key. The second key may also be used to decrypt the encrypted symmetric key prior to decrypting the data with the symmetric key.

In some embodiments, the first and second keys are associated with at least one of a file, a set of files, and a user.

In some embodiments, the data key is associated with at least one of a block and a file.

In some embodiments, using the first key to protect the write operation further involves appending an amount of padding in the encrypted data to the encrypted data.

In some embodiments, the write operation is protected prior to performing the write operation with a remote storage mechanism, and the read operation is protected after performing the read operation with the remote storage mechanism.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
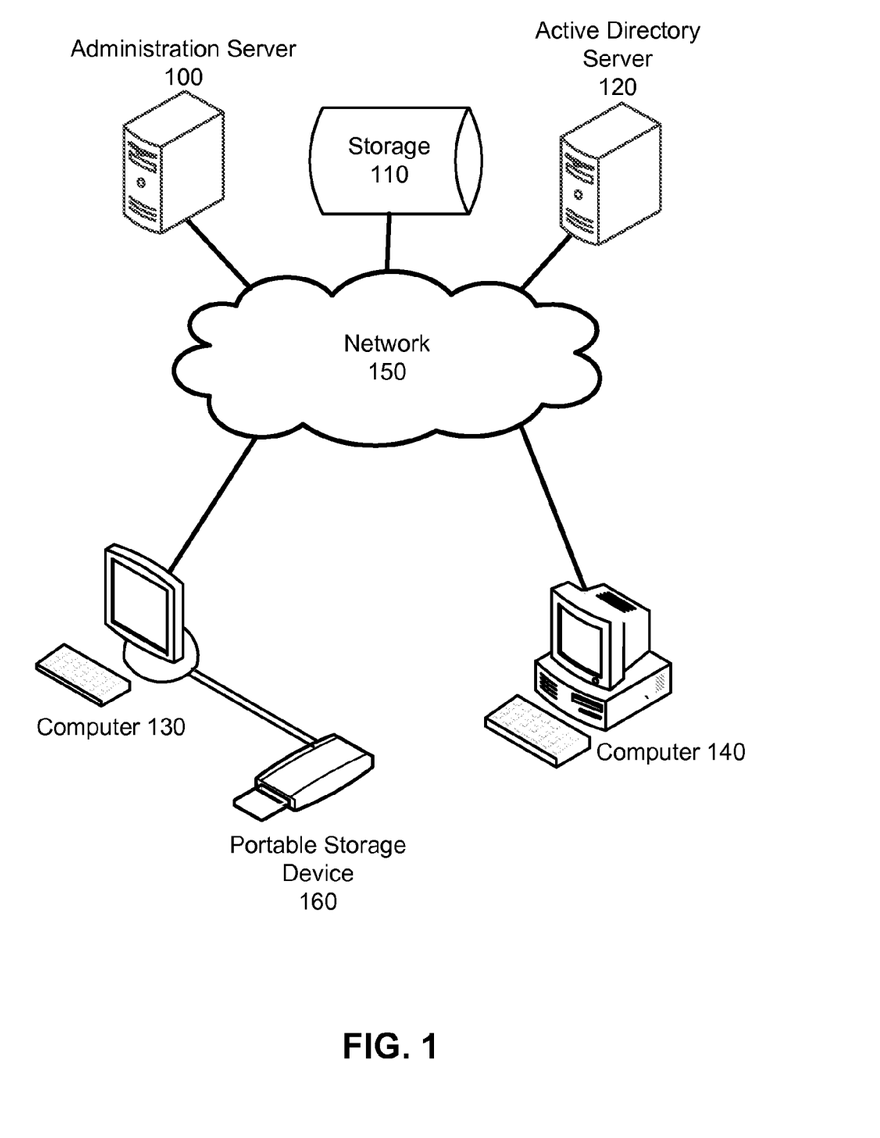
FIG. 1 shows a schematic of a system in accordance with the disclosed embodiments.

FIG. 1 shows a schematic of a system in accordance with an embodiment. As shown in FIG. 1, the system includes an administration server 100, storage 110, an active directory server 120, a set of computers 130-140, a network 150, and a portable storage device 160. Each of the components is described in further detail below.

Computers 130-140 may correspond to electronic devices that may be used to perform tasks for users of computers 130-140. For example, each computer 130-140 may correspond to a personal computer (PC), laptop computer, and/or workstation. Network 150 may correspond to a computer network, such as a local area network (LAN), wide area network (WAN), wireless network, intranet, internet, and/or another type of network that facilitates communication among devices (e.g., administration server 100, storage 110, active directory server 120, computers 130-140) connected to network 150. For example, computers 130-140 may operate as clients in network 150 and allow users of computers 130-140 to send and receive emails, retrieve web pages, and/or send and receive files with other computers and/or servers (e.g., administration server 100, active directory server 120) on network 150.

Computers 130-140 may serve as host computing resources and environments for guest virtual computing environments. In one or more embodiments, the virtual computing environments correspond to virtual machines that execute operating systems locally on computers 130-140, but in isolation from other virtual machines and host computing environments (e.g., native operating systems) on computers 130-140. The virtual computing environments may also provide other types of virtualization to users of computers 130-140, such as application virtualization and/or resource (e.g., network, memory, storage, processor, etc.) virtualization. For example, computer 130 may include three virtual computing environments respectively running Linux, Mac OS X (OS X™ is a registered trademark of Apple Inc.), and Microsoft Windows (Microsoft Windows™ is a registered trademark of Microsoft Corp.). Applications and/or processes that are specific to an operating system may thus run on computers 130-140 within the virtual computing environment containing the operating system. In other words, the execution of one or more virtual computing environments on computers 130-140 may provide increased versatility, utilization of resources, and/or security to computers 130-140. Software such as VMware Workstation (Windows), VMware Fusion (Mac) (VMware Fusion™ is a registered trademark of VMware, Inc.), Parallels, and VirtualBox (VirtualBox™ is a registered trademark of Oracle America, Inc.) may be used to provide these capabilities.

In one or more embodiments, the system of FIG. 1 enables the central management and local execution of virtual computing environments. Such central management and local execution may allow the virtual computing environments to be configured from a central location and efficiently deployed to multiple users from the central location. Moreover, changes and updates to the virtual computing environments may be automatically propagated to the users from the central location, resulting in significant savings in time and resources. An example of a central management solution for locally executed virtual computing environments may include the MokaFive Server, Player and Creator products offered by MokaFive (moka5, Inc., a Delaware corporation). In particular, the MokaFive Player may be used with computers 130-140 to locally execute a centrally defined and managed virtual computing environment according to rules and access controls defined in the MokaFive Server.

Administration server 100 may be a server that supports centralized definition of virtual computing environments and management of access and permissions to the same for local execution. For example, administration server 100 may be provided by the MokaFive Server. Administration server 100 may itself execute in a virtual computing environment, such as a VMware ESX environment. An administrator of virtual computing environments for computers 130-140 may create, configure, and delete the virtual computing environments by interacting with administration server 100 through a management interface (e.g., graphical user interface (GUI), web-based user interface, etc.) provided by administration server 100.

Active directory server 120 may provide network-based directory services. For example, active directory server 120 may be a Microsoft Active Directory (Active Directory™ is a registered trademark of Microsoft Corp.) Domain Controller, OpenLDAP server, OpenID, and/or another commercially available directory server. More specifically, active directory server 120 may store, organize, and provide access to users, groups, and permissions associated with virtual computing environments managed through administration server 100. For example, active directory server 120 may enable a hierarchical framework of services (e.g., virtual computing environments) and users (e.g., user accounts and groups) within network 150 to be used by administration server 100 in defining access permissions and policies to virtual computing environments.

In one or more embodiments, virtual computing environments executed on computers 130-140 are stored in storage 110. Storage 110 may correspond to network attached storage (NAS), a web server with attached storage, a storage area network (SAN), and/or another storage mechanism that is accessible through network 150. Computers 130-140 may obtain the virtual computing environments from storage 110 through network 150 and execute the virtual computing environments locally to enable users of computers 130-140 to interact with the virtual computing environments.

To access the virtual computing environments, each computer 130-140 may include one or more subscriptions to virtual computing environments stored in storage 110. Each subscription may identify administration server 100 and a specific virtual computing environment provided by administration server 100. To execute the virtual computing environment, a user of the computer may provide authentication credentials for the virtual computing environment to administration server 100, which may relay the authentication credentials to the active directory server 120 as necessary. If the user is authorized to use the virtual computing environment, the virtual computing environment is downloaded from storage 110 over network 150 and loaded on the computer for use by the user.

In one or more embodiments, virtual computing environments on computers 130-140 are stored in layered filesystems. The layered filesystems may separate different components of the virtual computing environments into individually managed layers based on policies for the layered filesystems. In one or more embodiments, each layered filesystem includes a system layer that stores an image of a virtual computing environment obtained from storage 110 and/or administration server 100. The layered filesystem may also include an application layer for storing user-installed applications, as well as a user data layer for storing user-specific documents and settings.

The layered filesystems may further facilitate the management of the virtual computing environments by enabling individual layers to be added, removed, temporarily disabled, and/or restored. In particular, the system layer may be periodically populated with a new image of the virtual computing environment from storage 110 and/or administration server 100. As a result, computers 130-140 may always execute the most up-to-date versions of the virtual computing environments. Furthermore, the application layer may be removed or temporarily disabled if a virus or malfunctioning application is installed in the application layer. Snapshots or backups of individual layers may additionally enhance the security, reliability, and integrity of the virtual computing environments. Management and execution of virtual computing environments using layered filesystems is described in a co-pending non-provisional application by inventors Thomas Joseph Purtell II and John Whaley, entitled "Policy-Based Layered Filesystem Management," having Ser. No. 12/435,279, and filing date 4 May 2009, which is incorporated herein by reference.

As described in the above-referenced applications, data created using a virtual computing environment may be stored in a separate layer of a filesystem than the operating system and/or applications in the virtual computing environment. The data may also be stored and/or backed up on network-based storage (e.g., storage 110) to enable recovery of the data and/or access to the data outside the virtual computing environment. For example, the data may be an image, document, audio, video, and/or other type of file that is created on and/or used with a virtual computing environment. Moreover, saving of the data within the virtual computing environment may cause the data to be transmitted from the virtual computing environment to cloud storage. The data may be then persisted on the cloud storage and/or downloaded to electronic devices that are authorized to access the data.

However, the network-based storage may be untrusted and/or insecure, thus exposing the data to increased risk of unauthorized access and/or tampering. Continuing with the above example, an attacker may intercept and/or modify the data during transmission of the data from the virtual computing environment to the network-based storage (e.g., during "writing" of the data to the network-based storage) and/or from the network-based storage to an electronic device authorized to access the data (e.g., during "reading" of the data from the network-based storage). Alternatively, the attacker may gain access to the stored data by obtaining authentication credentials for a user account associated with the data on the network-based storage and providing the authentication credentials to the network-based storage.

In one or more embodiments, access to and/or storage of data on untrusted and/or third party network-based storage is secured by encrypting the data before the data is transmitted (e.g., written) to the network-based storage and decrypting the data after the data is obtained (e.g., read) from the network-based storage. In addition, different cryptographic keys may be used to protect reading and writing of the data and/or metadata for the data. Such use of separate keys with operations, data, and/or metadata may protect the data and/or metadata from unauthorized access and/or modification while enabling fine-grained access control to the data and/or metadata by authorized users, as discussed in further detail below with respect to FIG. 2.

Figure 2:
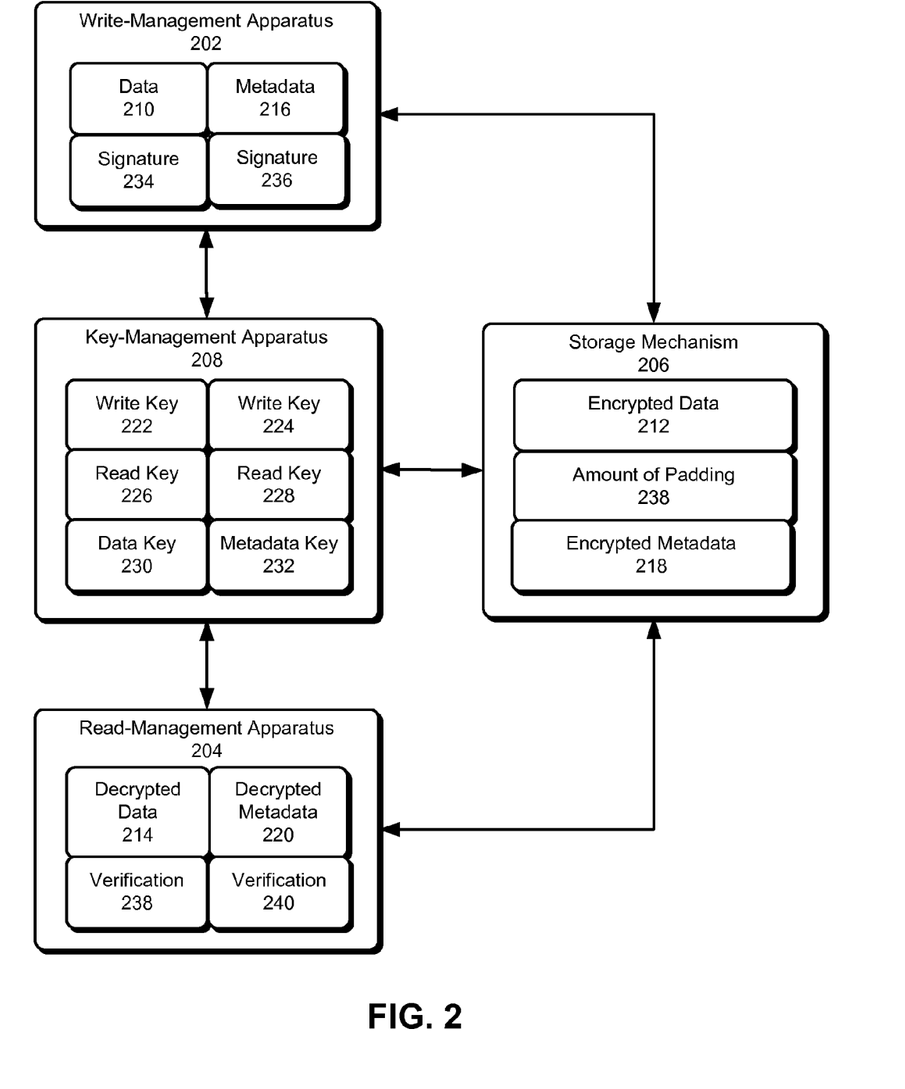
FIG. 2 shows a system for processing data in accordance with the disclosed embodiments.

FIG. 2 shows a system for processing data 210 in accordance with the disclosed embodiments. More specifically, FIG. 2 shows a system for protecting data 210 during use of the data with a potentially insecure storage mechanism 206.

Data 210 may be written to storage mechanism 206 from a write-management apparatus 202 and read from storage mechanism 206 using a read-management apparatus 204. For example, write-management apparatus 202 may be associated with an application and/or virtual computing environment used to create and/or store the data on a personal computer, laptop computer, tablet computer, portable media player, digital media receiver, and/or other network-enabled electronic device. To facilitate recovery of and/or access to data 210, write-management apparatus 202 may transmit data 210 to a network-accessible storage mechanism 206 such as storage 110 of FIG. 1, NAS, a SAN, a server with attached storage, and/or cloud storage. After data 210 is stored on storage mechanism 206, read-management apparatus 204 may obtain data 210 from storage mechanism 206 for use with the same electronic device and/or a different electronic device.

Prior to transmitting data 210 to storage mechanism 206 (e.g., performing a write operation with storage mechanism 206), write-management apparatus 202 may encrypt data 210 so that data 210 is transmitted to storage mechanism 206 and stored on storage mechanism 206 as encrypted data 212. Encrypted data 212 may then be transmitted from storage mechanism 206 to read-management apparatus 204, which decrypts encrypted data 212 to obtain decrypted data 214 that is identical to data 210 (e.g., after performing a read operation on encrypted data 212 with storage mechanism 206). In other words, write-management apparatus 202 and read-management apparatus 204 may protect data 210 from unauthorized access by enabling the transmission and storage of encrypted data 212 instead of unencrypted data 210, as well as use of decrypted data 214 by users authorized to access data 210.

More specifically, a data key 230 and/or other keys used to protect data 210 may be provided to write-management apparatus 202 and/or read-management apparatus 204 by a key-management apparatus 208. For example, key-management apparatus 208 may be a server, such as administration server 100 and/or active directory server 120 of FIG. 1, that selects keys used in protecting data 210 and/or other data associated with storage mechanism 206 and transmits the keys to write-management apparatus 202 and/or read-management apparatus 204. Write-management apparatus 202 may use data key 230 to encrypt data 210, and read-management apparatus 204 may use the same data key 230 to generate decrypted data 214 from encrypted data 212. Data key 230 may thus be a symmetric key that enables efficient encryption and decryption of data 210.

To protect data 210 from tampering and/or unauthorized modification, key-management apparatus 208, write-management apparatus 202, and/or read-management apparatus 204 may use different keys to protect write operations and read operations on data 210. As shown in FIG. 2, write-management apparatus 202 may use a write key 222 from management apparatus 208 to protect a write operation on data 210, while read-management apparatus 202 may use a read key 226 from management apparatus 208 to protect a read operation on data 210.

In particular, write-management apparatus 202 may obtain write key 222 as a private key in an asymmetric private/public key pair and use write key 222 to generate a signature 234 associated with data 210. Signature 234 may be generated from data 210, a hash value computed from data 210, and/or another representation of data 210 and transmitted to storage mechanism 206 along with encrypted data 212 during writing of data 210 to storage mechanism 206. Next, read-management apparatus 204 may obtain read key 226 as a public key in the asymmetric private/public key pair and use read key 226 to generate a verification 238 of signature 234 during reading and/or decryption of encrypted data 212. In other words, write key 222 may be used to write data 210 that can be verified, and read key 226 may be used to verify the authenticity and/or integrity of data 210.

Write key 222 may additionally and/or alternatively be used to encrypt data key 230 and store the encrypted data key 230 along with encrypted data 212 during the write operation. Read key 226 may then be used to decrypt the encrypted data key 230, and the decrypted data key 230 may be used to decrypt encrypted data 212. Consequently, write key 222 and read key 226 may be used to securely share data key 230 between write-management apparatus 202 and read-management apparatus 204 in the absence of a central management apparatus 208 for providing keys associated with protecting data 210.

As shown in FIG. 2, an amount of padding 238 may also be stored with encrypted data 212 and/or signature 234 in storage mechanism 206. Write-management apparatus 204 may determine amount of padding 238 by performing a modulo operation of the length of data 210 with the block size used to encrypt data 210, and subtracting the result of the modulo operation from the block size. Write-management apparatus 204 may then append amount of padding 238 to encrypted data 218 (e.g., as a sequence of 0's) for storage in storage mechanism 206. Read-management apparatus 204 may subsequently obtain amount of padding 238 with encrypted data 212 by performing a modulo operation of the length of encrypted data 212 and use amount of padding 238 to determine the original size of data 210 without decrypting encrypted data 212.

To further protect and/or manage access to data 210, write-management apparatus 202 and read-management apparatus 204 may use a different set of keys to protect operations on metadata 216 for data 210, which may include a filename associated with data 210, a path for data 210, and/or other information related to data 210. For example, write-management apparatus 202 may use a metadata key 232 to encrypt metadata 216 before writing metadata 216 to storage mechanism 206 so that metadata 216 is stored as encrypted metadata 218 in storage mechanism 206. Write-management apparatus 202 may also use a different write key 224 to generate an encrypted metadata key and/or signature 236 associated with metadata 236 for storage along with encrypted metadata 218 in storage mechanism 206. In turn, read-management apparatus 204 may use metadata key 232 to generate decrypted metadata 220 from encrypted metadata 218 after reading encrypted metadata 218 from storage mechanism 208. Read-management apparatus 204 may also use a different read key 228 to generate a verification 240 of signature 236 and/or decrypt metadata key 232.

By using different keys to protect different operations (e.g., read operations, write operations, etc.) on data 210, the system of FIG. 2 may maintain the confidentiality and integrity of data 210. For example, the system of FIG. 2 may prevent an attacker from obtaining data 210 during transmission of packets containing encrypted data 212 between storage mechanism 206 and/or one or more electronic devices associated with write-management apparatus 202 and/or read-management apparatus 204. In addition, the encryption, decryption, and/or verification of data 210 independently from the use of storage mechanism 206 to store data 210 (e.g., as encrypted data 212) may allow data 210 to be protected even if the attacker gains direct access to storage mechanism 206 (e.g., by exploiting a vulnerability associated with storage mechanism 206).

Moreover, the use of different sets of keys for data 210 and metadata 216 may enable fine-grained access control for both data 210 and metadata 216. For example, both write key 222 and read key 226 may be given to a user with permission to write and/or modify data 210, while only read key 226 may be provided to a user with permission to read data 210. Along the same lines, write key 224 and/or read key 228 may be provided to a less trusted user to enable access to metadata 216 (e.g., for use in analytics related to data 210) and/or modification of metadata 216 (e.g., renaming of and/or relocating a file containing data 210) by the user without granting access to data 210 for the user.

To further manage, track, and/or protect access to data 210 and/or metadata 216, the system of FIG. 2 may apply write keys 222-224, read keys 226-228, and/or data key 230 and metadata key 232 to different types and/or amounts of data 210 and/or metadata 216. First, data key 230 and/or metadata key 232 may be applied to a block and/or a file associated with data 210 and/or metadata 216. For example, data key 230 may be used to encrypt and decrypt an entire file containing data 210, or individual blocks in the file may be encrypted and/or decrypted in a round-robin fashion using data key 230 and a set of other data keys. Second, write keys 222-224 and read keys 226-228 may be associated with a file, a set of files, and/or a user. For example, read and/or write access to the file and/or a directory containing one or more files may be granted to a set of users by assigning the same read and/or write key to the file and/or directory. On the other hand, tracking of modifications to the file by the user and/or other users may be enabled by assigning each user with permission to write to the file a different read/write key pair and/or using a different read/write key pair for each modification to the file.

Those skilled in the art will appreciate that the system of FIG. 2 may be implemented in a variety of ways. As mentioned above, write-management apparatus 202 and read-management apparatus 204 may reside on the same electronic device and/or different electronic devices. For example, write-management apparatus 202 and read-management apparatus 204 may be used by an application and/or virtual computing environment on a laptop computer to securely store, access, and/or update a file stored on a remote storage mechanism 206. Alternatively, write-management apparatus 202 may be used to perform and protect writing of the file to storage mechanism 206 from the laptop computer, and read-management apparatus 204 may be used to perform and protect reading of the file from storage mechanism 206 on a tablet computer, provided the user of the tablet computer is authorized to read the file.

Moreover, write-management apparatus 202 and read-management apparatus 204 may use different types and/or combinations of cryptographic techniques to protect operations associated with data 210 and metadata 216. For example, the techniques described above for protecting read and write operations on data 210 and metadata 216 may be used with salts, different types of encryption, initialization vectors, prevention of rollback attacks, and/or other techniques for securing data.

Finally, the functionality of key-management apparatus 208 may be implemented using various techniques and/or devices. As described above, key-management apparatus 208 may be a centralized server that selects keys for use with different groups and/or types of users, data, and/or metadata and provides the keys to write-management apparatus 202 and read-management apparatus 204 for use in protecting read and write operations associated with the users, data, and/or metadata. Conversely, key-management apparatus 208 may be implemented in a decentralized manner by write-management apparatuses (e.g., write-management apparatus 202) and read-management apparatuses (e.g., read-management apparatus 204) associated with different applications, users, and/or electronic devices. To facilitate secure transmission of data keys (e.g., data key 230, metadata key 232) among the write-management apparatuses and read-management apparatuses, each write-management apparatus may encrypt a data key using a write key and transmit the encrypted data key to a read-management apparatus. The read-management apparatus may then use the read key corresponding to the write key to decrypt the data key for subsequent use in decrypting data and/or metadata encrypted using the data key.

Figure 3:
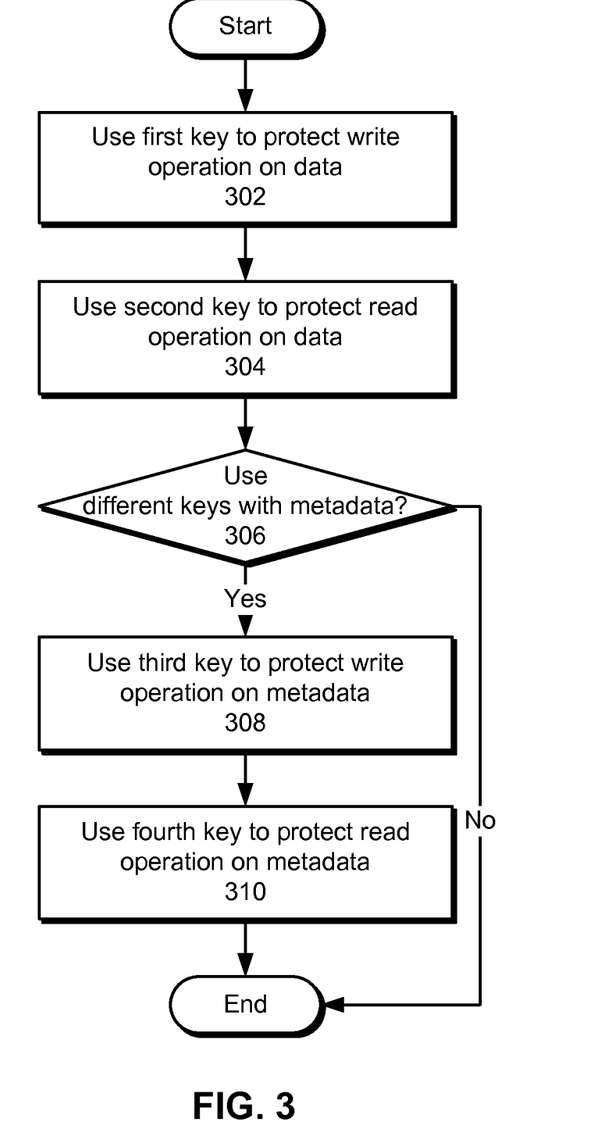
FIG. 3 shows a flowchart illustrating the processing of data in accordance with the disclosed embodiments.

FIG. 3 shows a flowchart illustrating the processing of data in accordance with the disclosed embodiments. In one or more embodiments, one or more of the steps may be omitted, repeated, and/or performed in a different order. Accordingly, the specific arrangement of steps shown in FIG. 3 should not be construed as limiting the scope of the technique.

Initially, a first key is used to protect a write operation on the data (operation 302), and a second key is used to protect a read operation on the data (operation 304). The write and read operations may be performed with network-accessible storage such as untrusted and/or third party cloud storage. To protect the write operation, the data may be encrypted using a data key (e.g., a symmetric key), and a signature for the data may be generated using the first key (e.g., a private key from a public/private key pair). The amount of padding in the encrypted data may also be appended to the encrypted data to enable calculation of the original length of the data without decrypting the data. To protect the read operation, the data key may be used to decrypt the data, and the signature for the data may be verified using the second key (e.g., a public key from the public/private key pair).

Different keys may also be used with metadata (operation 306) for the data. For example, the metadata may be encrypted and/or decrypted using different keys than the data to enable read and/or write access to the metadata independently from read and/or write access to the data. If different keys are not used with the metadata, read and write operations on the metadata may be protected using the same keys as read and write operations on the data.

If different keys are used with the metadata, a third key is used to protect a write operation on the metadata (operation 308), and a fourth key is used to protect a read operation on the metadata (operation 310). For example, the metadata may be encrypted using a metadata key (e.g., a symmetric key), and a signature for the metadata may be generated using the third key (e.g., a private key from a public/private key pair). Any padding used in encrypting the metadata may also be indicated by appending the amount of padding in the encrypted metadata to the encrypted metadata. The metadata key may then be used to decrypt the data, and the signature for the metadata may be verified using the fourth key (e.g., a public key from the public/private key pair).

Figure 4:
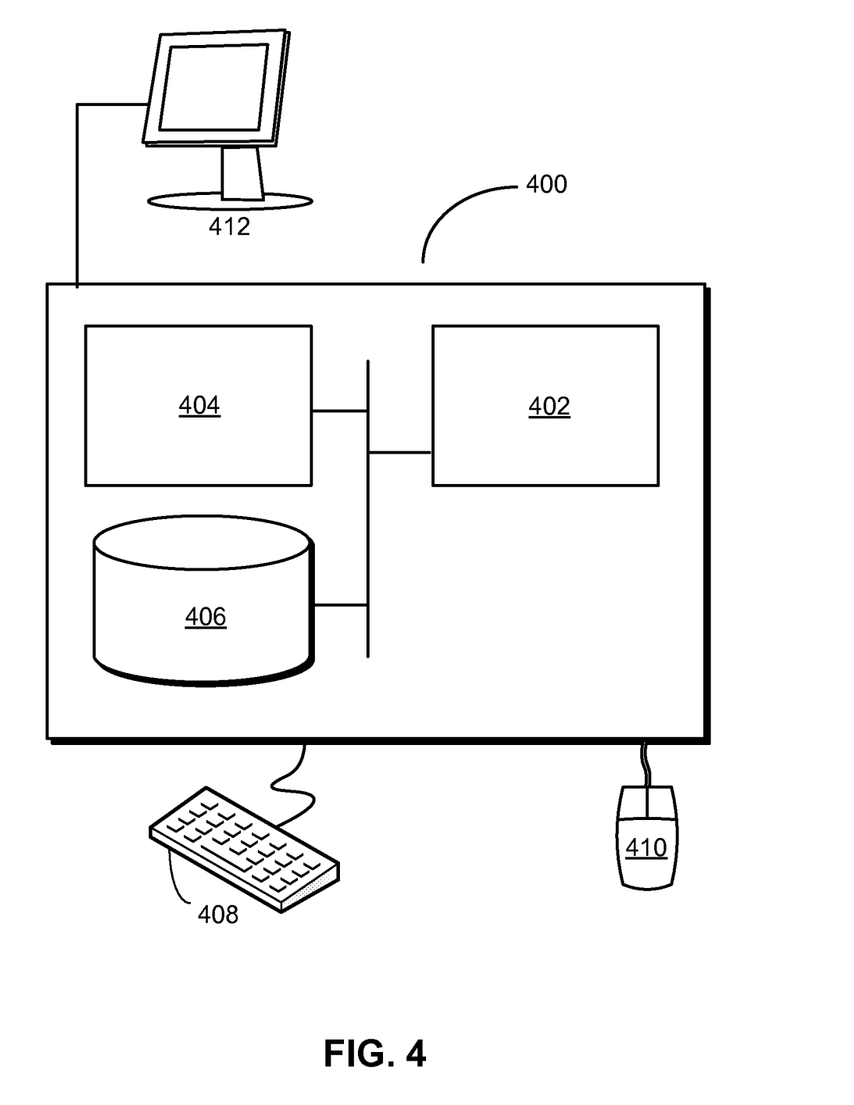
FIG. 4 shows a computer system in accordance with the disclosed embodiments.

FIG. 4 shows a computer system 400 in accordance with the disclosed embodiments. Computer system 400 includes a processor 402, memory 404, storage 406, and/or other components found in electronic computing devices. Processor 402 may support parallel processing and/or multi-threaded operation with other processors in computer system 400. Computer system 400 may also include input/output (I/O) devices such as a keyboard 408, a mouse 410, and a display 412.

Computer system 400 may include functionality to execute various components of the present embodiments. In particular, computer system 400 may include an operating system (not shown) that coordinates the use of hardware and software resources on computer system 400, as well as one or more applications that perform specialized tasks for the user. To perform tasks for the user, applications may obtain the use of hardware resources on computer system 400 from the operating system, as well as interact with the user through a hardware and/or software framework provided by the operating system.

In one or more embodiments, computer system 400 provides a system for processing data. The system may include a write-management apparatus that uses a first key to protect a write operation on the data. The system may also include a read-management apparatus that uses a second key to protect a read operation on the data. The write-management apparatus may also use a third key to protect the write operation on metadata for the data, and the read-management apparatus may use a fourth key to protect the read operation on the metadata. Finally, the system may include a key-management apparatus that provides one or more of the keys to the write-management apparatus and/or read-management apparatus.

In addition, one or more components of computer system 400 may be remotely located and connected to the other components over a network. Portions of the present embodiments (e.g., write-management apparatus, read-management apparatus, key-management apparatus, etc.) may also be located on different nodes of a distributed system that implements the embodiments. For example, the present embodiments may be implemented using a cloud computing system that manages the protection of write and read operations on data and/or metadata associated with a set of remote electronic devices.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for processing data, comprising:
   using a first key to protect a write operation on the data by encrypting, by computer, the data with a data key and generating a signature associated with the data with the first key;
   using a second key to protect a read operation on the data by decrypting the data with the data key and verifying the signature associated with the data with the second key;
   using a third key to protect a write operation on metadata for the data by encrypting the metadata with a metadata key and generating a signature associated with the metadata with the third key;
   using a fourth key to protect a read operation on the metadata by decrypting the metadata with the metadata key and verifying the signature associated with the metadata with the fourth key;
   determining an amount of padding by performing a modulo operation on a length of the data with a block size used to encrypt the data and subtracting a result of the modulo operation from the block size; and
   appending the determined amount of padding to the encrypted data;

wherein the write operation is protected prior to performing the write operation with a remote storage mechanism; and wherein the read operation is protected after performing the read operation with the remote storage mechanism.

2. The computer-implemented method of claim 1, wherein the first and second keys are associated with at least one of a file, a set of files, and a user.

3. The computer-implemented method of claim 1, wherein the data key is associated with at least one of a block and a file.

4. The computer-implemented method of claim 1, wherein using the first key to protect the write operation further involves: appending an amount of padding in the encrypted data to the encrypted data.

5. A system for processing data, comprising:
a write-management apparatus configured to:
use a first key to protect a write operation on the data by encrypting the data with a data key and generating a signature associated with the data with the first key; and
use a third key to protect a write operation on metadata for the data by encrypting the metadata with a metadata key and generating a signature associated with the metadata with the third key; and
a read-management apparatus configured to:
use a second key to protect a read operation on the data by decrypting the data with the data key and verifying the signature associated with the data with the second key;
use a fourth key to protect a read operation on the metadata by decrypting the metadata with the metadata key and verifying the signature associated with the metadata with the fourth key;
wherein using the first key to protect the write operation further involves:
a determination of an amount of padding via a modulo operation performed on a length of the data with a block size used to encrypt the data and a subtraction of a result of the modulo operation from the block size; and
the determined amount of padding being appended to the encrypted data;
wherein the write operation is protected prior to the write operation being performed with a remote storage mechanism; and wherein the read operation is protected after the read operation is performed with the remote storage mechanism.

6. The system of claim 5, further comprising:
a management apparatus configured to:
provide the first key to the write-management apparatus; and
provide the second key to the read-management apparatus.

7. A non-transitory computer-readable storage medium storing instructions that when executed by a computer cause the computer to perform a method for processing data, the method comprising:
using a first key to protect a write operation on the data by encrypting the data with a data key and generating a signature associated with the data with the first key; and
using a second key to protect a read operation on the data by decrypting the data with the data key and verifying the signature associated with the data with the second key;
using a third key to protect a write operation on metadata for the data by encrypting the metadata with a metadata key and generating a signature associated with the metadata with the third key; and
using a fourth key to protect a read operation on the metadata by decrypting the metadata with the metadata key and verifying the signature associated with the metadata with the fourth key;
wherein using the first key to protect the write operation further involves:
determining an amount of padding by performing a modulo operation on a length of the data with a block size used to encrypt the data and subtracting a result of the modulo operation from the block size; and
appending the determined amount of padding to the encrypted data;
wherein the write operation is protected prior to performing the write operation with a remote storage mechanism; and wherein the read operation is protected after performing the read operation with the remote storage mechanism.

8. The computer-readable storage medium of claim 7, wherein the first and second keys are associated with at least one of a file, a set of files, and a user, and wherein the data key is associated with at least one of a block and the file.

* * * * *